United States Patent
Xing et al.

(10) Patent No.: US 9,488,507 B2
(45) Date of Patent: Nov. 8, 2016

(54) VISUAL INDICATION FOR ADJUSTABLE COMPONENT

(71) Applicant: SCHNEIDER ELECTRIC INDUSTRIES SAS, Rueil-Malmaison (FR)

(72) Inventors: Lee Fang Xing, Singapore (SG); Lim Wen Loong, Singapore (SG)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 228 days.

(21) Appl. No.: 14/134,742

(22) Filed: Dec. 19, 2013

(65) Prior Publication Data

US 2014/0174336 A1    Jun. 26, 2014

(30) Foreign Application Priority Data

Dec. 21, 2012 (SG) ................ 201209502-2

(51) Int. Cl.
| | | |
|---|---|---|
| *G01D 13/04* | (2006.01) | |
| *G05G 1/10* | (2006.01) | |
| *H01H 9/16* | (2006.01) | |
| *H01H 19/14* | (2006.01) | |
| *H01H 71/74* | (2006.01) | |

(52) U.S. Cl.
CPC ............... *G01D 13/04* (2013.01); *G05G 1/10* (2013.01); *H01H 9/16* (2013.01); *H01H 19/14* (2013.01); *H01H 9/161* (2013.01); *H01H 71/7463* (2013.01); *Y10T 29/49826* (2015.01)

(58) Field of Classification Search
CPC ........ G01D 13/04; H01H 9/16; H01H 19/14; H01H 19/161; H01H 71/7463; G05G 1/10; Y10T 29/49826
USPC ...... 116/62.1, 202, 302, 304, 310, 332, 335, 116/DIG. 5, 309, 284–288; 29/428
See application file for complete search history.

(56) References Cited

U.S. PATENT DOCUMENTS 2,693,165 A * 11/1954 Appleman ............. G05G 1/105
116/310
2,699,141 A * 1/1955 Gaguski ............... H01H 13/023
116/332

(Continued)

FOREIGN PATENT DOCUMENTS

| CN | 101159207 A | 4/2011 |
| CN | 102013349 A | 4/2011 |

(Continued)

OTHER PUBLICATIONS

Extended European Search Report from corresponding European Application 13185772.4 dated Mar. 28, 2014.

(Continued)

*Primary Examiner* — R. A. Smith
*Assistant Examiner* — Tania Courson
(74) *Attorney, Agent, or Firm* — Lando & Anastasi, LLP

(57) ABSTRACT

A visual indication member for an adjustable component and a method for providing a visual indication for an adjustable component can be provided, whereby the member comprises a coupling member for coupling to the adjustable component; a first portion comprising a first visual property; and wherein the first portion is configured to move to expose a visually distinguishable area.

32 Claims, 8 Drawing Sheets

(56) References Cited

U.S. PATENT DOCUMENTS

| | | | | |
|---|---|---|---|---|
| 2,999,148 | A * | 9/1961 | Kay | B60Q 3/004 |
| | | | | 116/287 |
| 4,131,033 | A * | 12/1978 | Wright | G05G 1/02 |
| | | | | 200/316 |
| 5,093,764 | A * | 3/1992 | Hasegawa | G05G 1/105 |
| | | | | 116/202 |
| 6,224,221 | B1 * | 5/2001 | Glienicke | G02B 6/0033 |
| | | | | 116/286 |
| 6,860,224 | B2 * | 3/2005 | Snider | G05G 1/105 |
| | | | | 116/286 |
| 7,255,061 | B2 * | 8/2007 | Denton | G05G 1/105 |
| | | | | 116/286 |
| 8,813,676 | B2 * | 8/2014 | Fuller | D06F 9/005 |
| | | | | 116/286 |
| 2005/0270779 | A1 * | 12/2005 | Mazur | G05G 1/105 |
| | | | | 362/253 |
| 2006/0164397 | A1 * | 7/2006 | Bruntz | D06F 9/005 |
| | | | | 345/172 |
| 2011/0141161 | A1 | 6/2011 | Linke | |

FOREIGN PATENT DOCUMENTS

| | | |
|---|---|---|
| CN | 201788811 U | 4/2011 |
| DE | 10 2008 064283 B3 | 9/2010 |
| GB | 2476163 A | 6/2011 |
| JP | S49 42267 Y1 | 11/1974 |
| JP | S50 66243 U | 6/1975 |
| JP | S53 134079 U | 10/1978 |
| JP | S60 125410 U | 8/1985 |
| JP | S60125410 U | 8/1985 |

OTHER PUBLICATIONS

Office Action issued by the European Patent Office from corresponding European Patent Application No. 13185772.4 issued Feb. 15, 2016.
First Office Action CN201310711163.6 mailed Jun. 23, 2015.
Second Office Action CN201310711163.6 mailed Feb. 1, 2016.

* cited by examiner (e)

(f)

(g)

VISUAL INDICATION FOR ADJUSTABLE COMPONENT

CROSS-REFERENCE TO RELATED APPLICATION

This application claims the benefit under 35 U.S.C. §119 of Singapore Patent Application No. 201209502-2 filed on Dec. 21, 2012 which is hereby incorporated herein by reference in its entirety for all purposes.

TECHNICAL FIELD

The present invention relates broadly to a visual indication member for an adjustable component and to a method for providing a visual indication for an adjustable component.

BACKGROUND

In the electronic industry, an energisable coil device such as a relay is typically used together with a user interface to allow a user in determining or selecting threshold parameters of sensed input such as current, voltage etc. The user interface typically comprises a settings panel and a dial. The settings panel is typically indicated with markings etched out e.g. by laser. The markings can be indicated with values such as 0%, 10%, 20% etc which represents the triggering level of a threshold value. For example, if a user selects 20% for an over-voltage setting using the dial, a relay triggers once the sensed voltage reaches more than 20% of an operating level. The markings of the panel which are typically black in colour for legibility and readability, can typically be clearly read by a user when the markings are used on a substantially white background.

Typically, the dial for the settings panel comprises a member which provides a pointer or indication to specific markings on the settings panel. For example, when the member points to a 10% marking, it can mean that the relay is monitoring a threshold of 10% of an operating level. In practice, relays are typically used in panels which can comprise a plurality of such relays. Thus, it can be a problem for a user to attempt to, for example, determine the set threshold level of a relay since the user has to first locate the specific relay and its member, and then read off the value on the settings panel of the relay.

Furthermore, in practice, control panels holding relays may be located or operated in low light conditions. In an environment of low light visibility, a user may additionally have a problem in reading off the values of the markings and positions of the dials. This can cause adjustment of the dials to be difficult for the user. The problem of visibility is compounded when adjustments have to be made to relays installed in a control panel. The size of a control panel is typically maintained to a small size to be attractive to users. Due to the restriction in the size of the control panels, the sizes of relays have to be kept small as well. As such, the sizes of a settings panel and dials of a relay are typically maintained at a small dimension, which can cause a problem or difficulty in readings and adjustment of the dials.

Moreover, more than one component of a relay may need to be controlled or selected at any one time. Thus, there may be multiple dials for different settings on a device. The difficulty of locating the member of a particular dial and then reading off respective values on the settings panel can increase with the increase in the number of dials on the device. Faced with a multitude of settings panels and dials, confusion may easily arise when a user needs to access, scrutinize and/or read off each value. As a result, efficiency may also be affected, for example during trouble-shooting sessions.

Hence, in view of the above, there exists a need for a visual indication member for an adjustable component and a method for providing a visual indication for an adjustable component that seeks to address at least one of the problems above.

SUMMARY

In accordance with a first aspect of the present invention, there is provided a visual indication member for an adjustable component, the member comprising, a coupling member for coupling to the adjustable component; a first portion comprising a first visual property; and wherein the first portion is configured to move to expose a visually distinguishable area.

The coupling member may comprise one or more gear teeth.

The visual indication member may further comprise, a base member comprising a first base portion comprising a second visual property; and a movable member comprising the first portion comprising the first visual property, the movable member being disposed above the base member.

The base member may further comprise a second base portion comprising the first visual property.

The base member may further comprise a step portion, the step portion comprising the second visual property.

The step portion may be configured to movably abut the movable member; the base member further comprising a recess portion to allow movement of the movable member within the recess upon said movably abutment; further wherein the base member itself is movable based on the coupling to the adjustable component.

The base member may be segregated into three segments, each segment spanning an arc angle of about 120° and the movable member is arranged to movably expose a segment that is visually distinguishable from the movable member.

Two of the segments may be visually distinguishable from the movable member.

The first visual property may be different from the second visual property such that the visually distinguishable area is formed from a contrast between the first and second visual properties.

The first and second visual properties may comprise different colours.

The visual indication member may further comprise the first portion being arranged to cover an area of a substantially transparent overlay disposed above the visual indication member; the coupling member being arranged for fixedly coupling to the adjustable component; and wherein the first portion is configured to move to expose a visually distinguishable area through the overlay due to a corresponding movement of the adjustable component.

The first visual property may comprise being substantially non-transparent; and further wherein the substantially non-transparent portion is configured to move to expose a light transmission area as the visually distinguishable area.

The visual indication member may further comprise, a base member; and a movable member comprising the substantially non-transparent portion, the movable member being disposed above the base member.

The light transmission area may be an area of the base member.

The base member may comprise a first base portion comprising a second visual property, the second visual property being substantially transparent; and a second base portion comprising the first visual property.

The base member may further comprise a step portion, the step portion comprising the second visual property.

The step portion may be configured to movably abut the movable member; the base member further comprising a recess portion to allow movement of the movable member within the recess upon said movably abutment; further wherein the base member itself is movable based on the coupling to the adjustable component.

The base member may be segregated into three segments, each segment spanning an arc angle of about 120° and the movable member is arranged to movably expose a segment that is capable of transmitting light.

Two of the segments may be capable of transmitting light.

The visual indication member may further comprise the substantially non-transparent portion being arranged to cover an area of a substantially transparent overlay disposed above the light transmission member; the coupling member being arranged for fixedly coupling to the adjustable component; and wherein the substantially non-transparent portion is configured to move to expose the light transmission area through the overlay due to a corresponding movement of the adjustable component.

In accordance with a second aspect of the present invention, there is provided a method for providing a visual indication for an adjustable component, the method comprising, coupling a visual indication member to the adjustable component; providing a first portion of the visual indication member, the first portion comprising a first visual property; and moving the first portion to expose a visually distinguishable area.

The method may further comprise using one or more gear teeth for the coupling step.

The method may further comprise, providing a base member comprising a first base portion comprising a second visual property; providing a movable member comprising the first portion comprising the first visual property; and disposing the movable member above the base member.

The base member may further comprise a second base portion comprising the first visual property.

The base member may further comprise a step portion, the step portion comprising the second visual property.

The method may further comprise, using the step portion to movably abut the movable member; providing a recess portion of the base member to allow movement of the movable member within the recess upon said movably abutment; and moving the base member itself based on the coupling to the adjustable component.

The method may further comprise segregating the base member into three segments, each segment spanning an arc angle of about 120° and providing the movable member to movably expose a segment that is visually distinguishable from the movable member.

Two of the segments may be visually distinguishable from the movable member.

The first visual property may be different from the second visual property such that the visually distinguishable area is formed from a contrast between the first and second visual properties.

The first and second visual properties may comprise different colours.

The method may further comprise disposing a substantially transparent overlay above the visual indication member; providing the first portion to cover an area of the substantially transparent overlay; the coupling step further comprising fixedly coupling the visual indication member to the adjustable component; and moving the first portion to expose a visually distinguishable area through the overlay due to a corresponding movement of the adjustable component.

The first visual property may comprise being substantially non-transparent; and further comprising moving the substantially non-transparent portion to expose a light transmission area as the visually distinguishable area.

The method may further comprise, providing a base member; providing a movable member comprising the substantially non-transparent portion; and disposing the movable member above the base member.

The light transmission area may be an area of the base member.

The base member may comprise a first base portion comprising a second visual property, the second visual property being substantially transparent; and a second base portion comprising the first visual property.

The base member may comprise a step portion, the step portion comprising the second visual property.

The method may further comprise, using the step portion to movably abut the movable member; providing a recess portion of the base member to allow movement of the movable member within the recess upon said movably abutment; and moving the base member itself based on the coupling to the adjustable component.

The method may further comprise segregating the base member into three segments, each segment spanning an arc angle of about 120° and providing the movable member to movably expose a segment that is capable of transmitting light.

Two of the segments may be capable of transmitting light.

The method may further comprise, disposing a substantially transparent overlay above the substantially non-transparent portion; providing the substantially non-transparent portion to cover an area of the substantially transparent overlay; the coupling step further comprising fixedly coupling to the adjustable component; and moving the substantially non-transparent portion to expose the light transmission area through the overlay due to a corresponding movement of the adjustable component.

BRIEF DESCRIPTION OF THE DRAWINGS

Example embodiments of the invention will be better understood and readily apparent to one of ordinary skill in the art from the following written description, by way of example only, and in conjunction with the drawings, in which.

DETAILED DESCRIPTION

Figure 1:
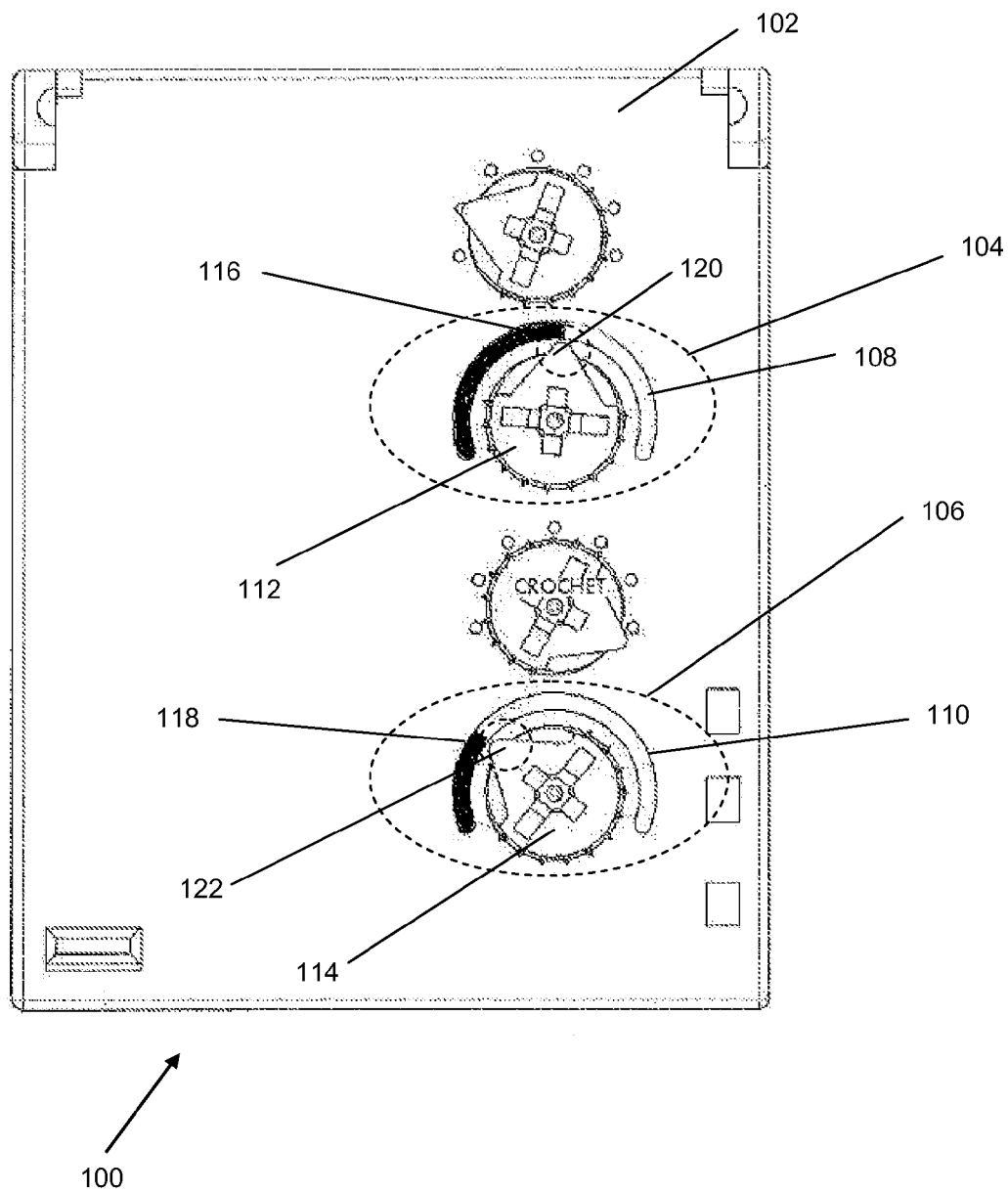
FIG. 1 is a front view of an energisable coil device in an example embodiment.

In the example embodiments, a visual indication member can be provided for an adjustable component of an energisable coil device such as a relay. In some example embodiments, the visual indication member can be a light transmission member.

In the description herein, an energisable coil device such as a relay may be provided, the device can include, but is not limited to, any device that can be switched/powered on and off such as an electrical relay or other electromechanical switching devices, components or parts. An energisation event of an energisable coil device can include, but is not limited to, an electrical powering on/off of the element and/or a mechanical switching on/off of the element.

In some embodiments, the visual indication member can comprise a single foreground member that in turn comprises a visual property for distinguishing the foreground member against a background. For example, the single member can comprise a visual property such as a dark colour, e.g. dark blue colour, so that the single foreground member can be distinguished against a bright background e.g. a background member or a background with a different colour e.g. the internal enclosure of an energisable coil device. Such distinguishing may be useful under low light conditions. The bright background may alternatively or additionally be provided with glitter dust or dots to further distinguish against the foreground member. In such embodiments, the visual indication member can be provided with a movable portion that is movable to expose a visually distinguishable area.

Alternatively, the visual indication member can be in a form of an actuating assembly comprising two or more members each having different visual properties whereby one foreground member is distinguished from another member based on the different visual properties. For example, the visual indication member can be provided with a movable member and a base member. The movable member can be disposed above the base member. That is, the movable member can be disposed directly on (i.e. in contact with) the base member, or at some distance from the base member. The movable member and the base member each can have a different visual property. For example, the base member may be red in colour while the movable member may be dark blue in colour so that as the movable member is moved, a visually distinguishable area between the two contrasting colours of dark blue and red can be exposed.

In some embodiments, the visual indication member can be a light transmission member. In such embodiments, the visual property or properties may be associated with light transmission or allowance. The light transmission member may be a single member or may be in a form of an actuating assembly comprising two or more members. The light transmission member can be provided with a substantially non-transparent portion that is movable to expose a visually distinguishable light transmission area. In some embodiments whereby the light transmission member comprises more than one member, the light transmission can comprise a movable member and a base member, the movable member can be disposed above the base member. That is, the movable member can be disposed directly on (i.e. in contact with) the base member, or at some distance from the base member.

In some embodiments, the visual indication member is coupled to the adjustable component e.g. using gear teeth such that movement of the adjustable component can cause movement of at least a portion/part of the visual indication member. In embodiments whereby the visual indication member comprises a light transmission member, movement of at least a portion/part of the light transmission member can directly or indirectly affect movement of the substantially non-transparent portion.

In some other embodiments, the coupling may be a fixed coupling such as using adhesive or the like, such that a movement of the adjustable component causes corresponding movement of one or more members of the visual indication member, e.g. the non-transparent portion of a light transmission member. For example, the visual indication member may be a foreground member that in turn comprises a visual property for distinguishing the foreground member against a background, although preferably, an additional base member is provided e.g. for stability of the foreground member during movement. The foreground member serves to substantially block/cover an area (substantially the full area) of a substantially transparent overlay disposed above the visual indication member (e.g. a viewable member), and that a movement of the adjustable component can cause the foreground member to correspondingly move so as to expose a visually distinguishable area, distinguished between the foreground member and a background, through an unblocked or uncovered part of the overlay.

As other examples whereby the visual indication member is a light transmission member, the light transmission member may be the non-transparent portion only, although preferably, a base member is provided e.g. for stability of the non-transparent portion during movement. The non-transparent portion serves to substantially block/cover an area (substantially the full area) of a substantially transparent overlay disposed above the light transmission member (e.g. a light indication member), and that a movement of the adjustable component can cause the non-transparent portion to correspondingly move so as to expose light from a light source to provide a visually distinguishable area through an unblocked or uncovered part of the overlay.

In some embodiments, the movement and/or abutment associated with the visual indication member is physical or mechanical. The coupling between the visual indication member and the adjustable component is preferably mechanical in form.

The terms "coupled" or "connected" as used in this description are intended to cover both directly connected or connected through one or more intermediate means, unless otherwise stated.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

FIG. 1 is a front view of an energisable coil device in an example embodiment. The energisable coil device 100 is a relay 100 in the example embodiment. In the example embodiment, the relay 100 may be used for setting thresholds of a sensed input, for example trigger levels for over-voltage, under-voltage, over-current, under-current etc. A user interface 102 is provided for a user to adjust threshold settings etc. For each parameter, e.g. voltage or current, an adjustable component and a corresponding value level visual indication can be provided. Refer to numerals 104, 106. At numerals 104, 106, viewable members 108, 110 respectively, and adjustable components 112, 114 respectively are provided. The viewable members may be clear or substantially transparent glass/plastic overlay overlaying a visual indication member. For example, the visual indication member can be a light indication or a light transmission member. In the example embodiment, the adjustable components 112, 114 can be in the form of dial components or knobs that can be adjusted by fingers or screwdrivers etc. The adjustable components are provided with a pointer or the like e.g. 120, 122 for the user to know the value level selected. The viewable members 108, 110 in association with the corresponding adjustable components 112, 114 are capable of showing the values or levels being selected using the adjustable components 112, 114.

For example, as shown in FIG. 1, a visual indication 116 is provided in the viewable member 108 for the value of about 55% in association with the dial setting (see 120) of the adjustable component 112. The visual indication may be based on a visually distinguishable area provided by a foreground member having a visual property, such as a colour, distinguishable from a background. The visual indication may alternatively be based on light transmission through the viewable member to provide a visually distinguishable area. A visual indication 118 is provided in the viewable member 110 for the value of about 30% in association with the dial setting (see 122) of the adjustable component 114. In the example embodiment, the viewable members 108, 110 each spans an arc angle of about 220°.

Figures 2A, 2B:
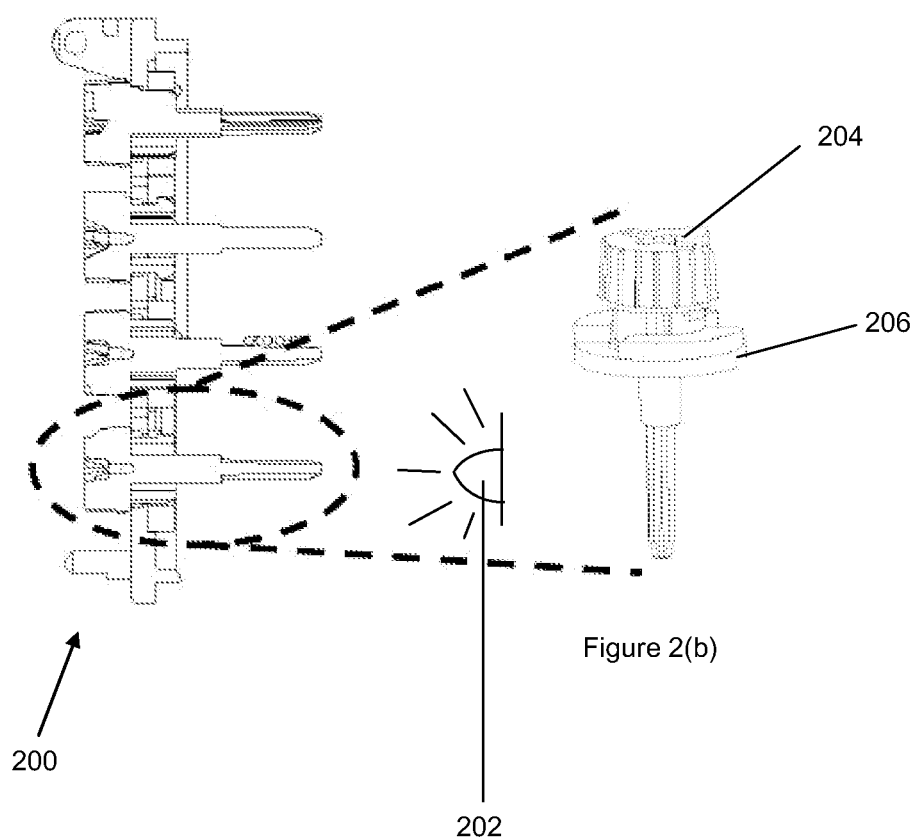
FIG. 2(a) is a side view of a break-away portion of an energisable coil device in an example embodiment.
FIG. 2(b) is a perspective view of a dial component of the energisble coil device.

FIG. 2(a) is a side view of a break-away portion of an energisable coil device in an example embodiment. The energisable coil device 200 can perform substantially identically to the relay 100 in FIG. 1.

There can preferably be provided a light source 202 used for indicating operation or powering-up of the energisable coil device 200. For example, the light source 202 lights up when the energisable coil device 200 is energized and in operation. In another example embodiment, light from the light source can be used to also provide or facilitate light indications in the viewable members (compare 108, 110 of FIG. 1) in association with adjustable components (compare 112, 114 of FIG. 1).

FIG. 2(b) is a perspective view of a dial component 204 of the energisable coil device 200. The dial component 204 is coupled to a visual indication member 206. In the example embodiment, the visual indication member 206 is in the form of an actuating assembly 206. The actuating assembly 206 cooperates with the dial component 204 to provide a visual indication (compare e.g. 118 of FIG. 1) for the energisable coil device 200 based on a visually distinguishable area provided by a foreground member having a visual property, such as a colour, distinguishable from a background.

In another example embodiment, allowable light from the light source 202 as allowed by the actuating assembly 206 through the viewable member (compare e.g. 110 of FIG. 1).

Figure 3:
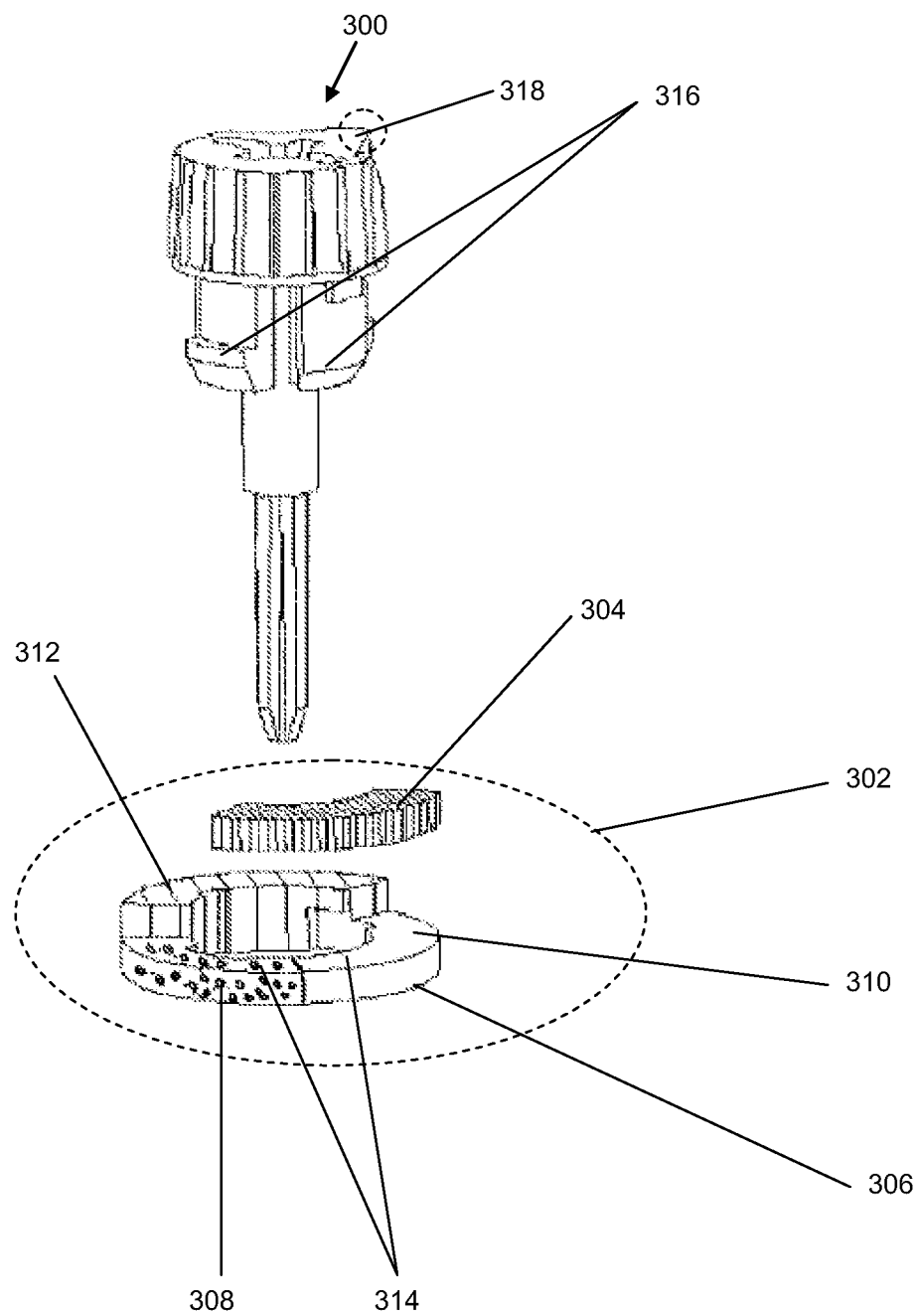
FIG. 3 is an exploded view of a dial component and an associated actuating assembly in an example embodiment.

FIG. 3 is an exploded view of a dial component 300 and an associated actuating assembly 302 in an example embodiment. The dial component 300 and the actuating assembly 302 are substantially identical to the dial component 204 and actuating assembly 206 of FIG. 2(b). In the example embodiment, the actuating assembly 302 comprises a movable member such as a disc 304 and a base member such as a disc holder 306. The disc 304 is disposed on the disc holder 306.

In the example embodiment, the disc holder 306 is substantially circular in shape. The disc 304 is substantially of an arc shape and is substantially flat. The arc periphery and radial thickness of the disc 304 and the disc holder 306 are complementary to each other.

In the example embodiment, the disc 304 comprises a first visual property. The disc 304 spans a radial or arc angle of about 120°. In the example embodiment, the first visual property forms a foreground visual property. The disc 304 may be a foreground member.

The disc holder 306 comprises a masked portion 308 comprising the first visual property as the disc 304. It will be appreciated that, alternatively, the masked portion 308 can comprise a different visual property as compared to the disc 304. The masked portion 308 spans a radial or arc angle of about 120°. The disc holder 306 further comprises a base portion 310 and a step portion 312. The base portion 310 spans a radial or arc angle of about 120°, while the step portion 312 spans a radial or arc angle of about 120°. The base portion 310 and the step portion 312 each comprise a second visual property that is different from the first visual property. The second visual property can form a background visual property. The masked portion 308 and the base portion 310 form a corresponding recess 314 to receive the disc 304.

Thus, in the example embodiment, the disc holder 306 is segregated into three segments, each segment spanning an arc angle of about 120°. In the example embodiment, two of the segments are capable of providing a background for a distinguishable area in contrast to members comprising the first visual property, for example, the step portion 312 and the base portion 310 comprising the second visual property can provide a background to the disc 304.

In the example embodiment, the corresponding recess 314 is a free recess which is provided to allow translational movement of the disc 304 on the disc holder 306. For example, since the disc 304 spans an angle of about 120°, there is a freedom of movement of another span arc of about 120° on the recess 314. The base portion 310 and the masked portion 308 are preferably of the same thickness. The step portion 312 protrudes in a step above the base portion 310 and the masked portion 308 by a thickness of about 1 mm. Preferably, the disc 304 has a substantially similar thickness. Optionally, the actuating assembly 302 is disposed substantially above a light source (compare 202 in FIG. 2).

The disc holder 306 further comprises coupling members/parts or mating members/parts, e.g. on the internal circumference, such as gear teeth, for engaging corresponding mating parts e.g. 316 provided on the dial component 300. Engagement between these mating parts can provide a corresponding movement of the disc holder 306 when the dial component 300 is turned in a clockwise or anti-clockwise direction. The dial component 300 is coupled to the actuating assembly 302 using the mating parts e.g. 316. Preferably, when coupled together, one end of the step portion 312 is disposed at a dial or pointer 318 of the dial component 300. The disc 304 is preferably placed on the disc holder 306 and in contact with the other end of the protruded step portion 312.

In the example embodiment, when the disc holder 306 moves due to corresponding movement of the dial component 300, a visually distinguishable area based on the different first and second visual properties can be exposed and displayed, based on exposure of portions such as the step portion 312 and/or the base portion 310, as contrasted against portions such as the masked portion 308 and the disc 304.

Thus, movement of the disc 304 is indirectly due to movement of the dial component 300. The movement of the dial component 300 causes a movement of the disc holder 306 due to the coupling between the actuating assembly 302 and the dial component 300. Upon a movable abutment of the step portion 312 with the disc 304, the disc 304 is physically moved along the recess 314. Upon movement of the disc 304, a visually distinguishable area, i.e. a portion or the whole of the base portion 310 of the disc holder 306, is exposed and viewable. That is, one segment of a distinguishable background can be exposed due to movement of the disc 304. In the example embodiment, the first visual property can be a dark colour such as dark blue colour and can form a foreground property. The second visual property can be a bright colour such as red colour and can form a contrasting background property. Thus, as the adjustable component is moved, the bright colour as a background can be distinguishable from the foreground colour.

In another example embodiment, a light source (compare 202 in FIG. 2) may be used to facilitate the visual indication. In the example embodiment, the first visual property may be a substantially non-transparent property. The second visual property may be a substantially transparent property. Like numerals from FIG. 3 are used for ease of illustration.

In the example embodiment, the disc 304 is substantially non-transparent to reduce light transmission through the disc 304. The disc 304 spans a radial or arc angle of about 120°.

The disc holder 306 comprises a masked portion 308 that is substantially non-transparent to reduce light transmission through the masked portion 308. The masked portion 308 spans a radial or arc angle of about 120°. The disc holder 306 further comprises a base portion or a substantially transparent portion 310 such as to improve light transmission through the substantially transparent portion 310, and a step portion 312. The substantially transparent portion 310 spans a radial or arc angle of about 120°, while the step portion 312 spans a radial or arc angle of about 120°. The step portion 312 is substantially transparent such as to improve light transmission through the step portion 312. The masked portion 308 and the substantially transparent portion 310 form a corresponding recess 314 to receive the disc 304.

Thus, in the example embodiment, the disc holder 306 is segregated into three segments, each segment spanning an arc angle of about 120°. In the example embodiment, two of the segments are capable of transmitting light (e.g. substantially transparent), for example, the step portion 312 and the substantially transparent portion 310.

In the example embodiment, the corresponding recess 314 is a free recess which is provided to allow translational movement of the disc 304 on the disc holder 306. For example, since the disc 304 spans an angle of about 120°, there is a freedom of movement of another span arc of about 120° on the recess 314. The substantially transparent portion 310 and the masked portion 308 are preferably of the same thickness. The step portion 312 protrudes in a step above the substantially transparent portion 310 and the masked portion 308 by a thickness of about 1 mm. Preferably, the disc 304 has a substantially similar thickness. Preferably, the actuating assembly 302 is disposed substantially above a light source (compare 202 in FIG. 2).

The disc holder 306 further comprises coupling members/parts or mating members/parts, e.g. on the internal circumference, such as gear teeth, for engaging corresponding mating parts e.g. 316 provided on the dial component 300. Engagement between these mating parts can provide a corresponding movement of the disc holder 306 when the dial component 300 is turned in a clockwise or anti-clockwise direction. The dial component 300 is coupled to the actuating assembly 302 using the mating parts e.g. 316. Preferably, when coupled together, one end of the step portion 312 is disposed at a dial or pointer 318 of the dial component 300. The disc 304 is preferably placed on the disc holder 306 and in contact with the other end of the protruded step portion 312.

In this example embodiment, when the disc holder 306 moves due to corresponding movement of the dial component 300, a light indication via, and providing, a visually distinguishable area can be displayed, based on exposure of substantially transparent portions such as the step portion 312 and/or the portion 310.

Thus, movement of the disc 304 is indirectly due to movement of the dial component 300. The movement of the dial component 300 causes a movement of the disc holder 306 due to the coupling between the actuating assembly 302 and the dial component 300. Upon a movable abutment of the step portion 312 with the disc 304, the disc 304 is physically moved along the recess 314. Upon movement of the disc 304, a light transmission area, i.e. a portion or the whole of the substantially transparent portion 310 of the disc holder 306, is exposed for light transmission. That is, one segment capable of transmitting light can be exposed due to movement of the disc 304.

Figure 4:
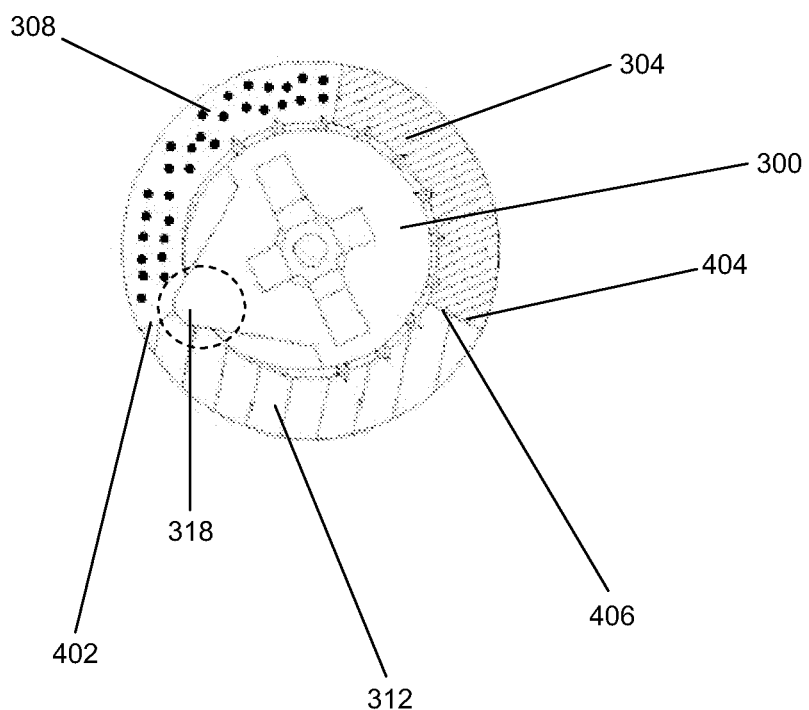
FIG. 4 is a top view of the dial component in cooperation with the actuating assembly in the example embodiment.

FIG. 4 is a top view of the dial component 300 in cooperation with the actuating assembly 302 in the example embodiment. In a start position as shown in FIG. 4, the disc 304 is disposed in the recess (compare 314 in FIG. 3) and placed over the base portion (compare 310 in FIG. 3). With similar span angles, the base portion 310 is therefore covered by the disc 304 in the top view. The pointer 318 is disposed at a first wall or end 402 of the step portion 312. A first wall or end 404 of the disc 304 abuts a second wall or end 406 of the step portion 312. The masked portion 308 is substantially uncovered by the disc 304 in the top view. In the example embodiment, a viewable member comprises a transparent cover provided overlaying the major area spanning from the wall 402 to the wall 406 (compare 110 in FIG. 1). That is, at the start position, only areas comprising a first visual property are shown.

In embodiments whereby the visual properties are associated with light transmission, at the start position, only areas that are e.g. non-transparent or opaque are shown. In such embodiments, a light source (not shown) is used for showing operation of the energisable coil device comprising the dial component 300 and the actuating assembly 302, and used also for the light indication in the example embodiments.

Figure 5:
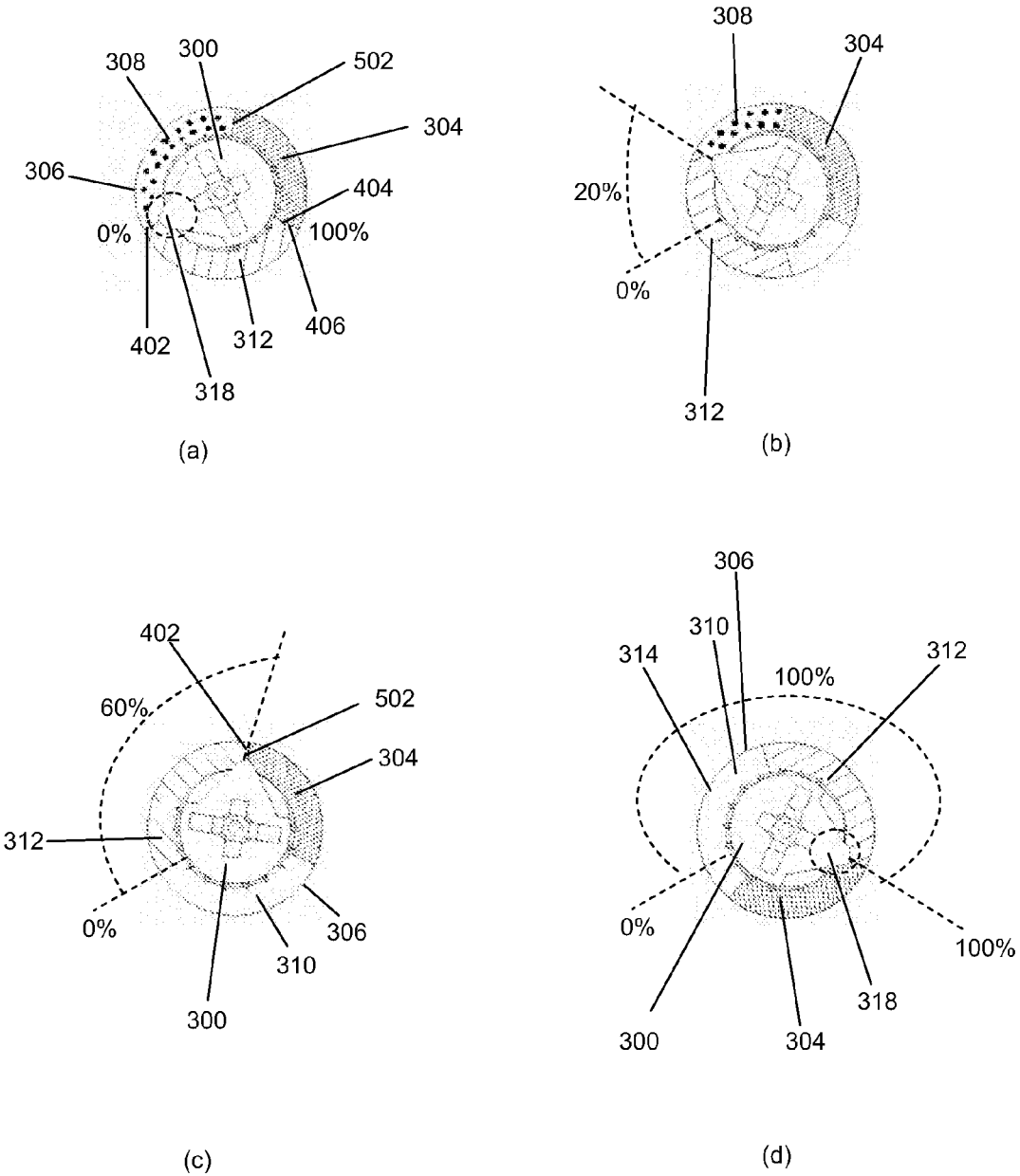
FIGS. 5(a)-5(g) show a flow diagram for illustrating positions of a dial component and an actuating assembly in an example embodiment.
Figure 5:
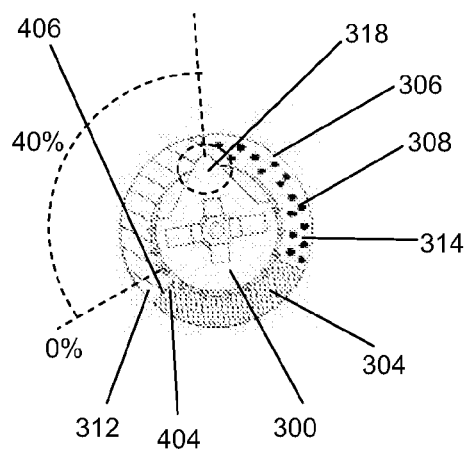
Figure 5:
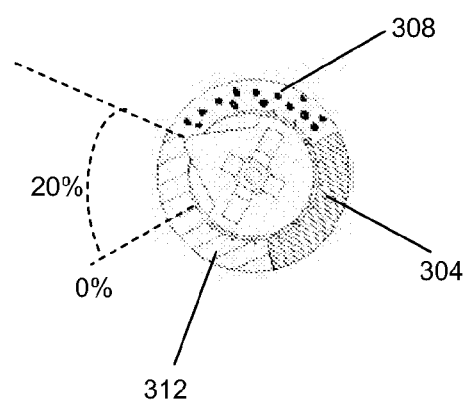
Figure 5:
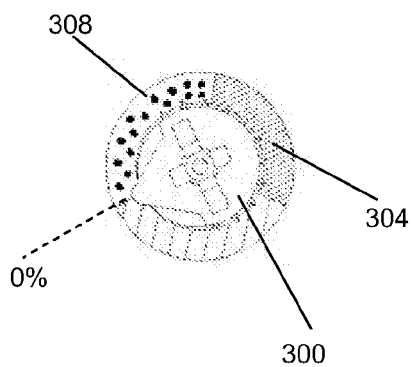

FIGS. 5(*a*)-5(*g*) show a flow diagram for illustrating positions of a dial component and an actuating assembly in an example embodiment. The dial component and the actuating assembly function substantially similarly to the dial component 300 and actuating assembly 302 of FIGS. 3 and 4. Thus, like numerals are used for ease of illustration.

Furthermore, for ease of illustration, the description that follows is related to an example embodiment whereby the visual properties are associated with light transmission. However, it will be appreciated that references to substantially non-transparent portions can be replaced by a first visual property and references to substantially transparent portions can be replaced by a second visual property. The first and second visual properties are different so as to provide a visually distinguishable area formed by a contrast between the first and second visual properties. For example, the first visual property can be a dark colour such as dark blue colour and can form a foreground property. The second visual property can be a bright colour such as red colour and can form a background property. Thus, as the dial component is moved, the bright colour as a background can be distinguishable from the foreground colour.

At step 5(*a*), when the dial component 300 is at the start position, the minor area spanning between wall 402 to 406 is hidden by a non-transparent or an opaque cover overlaying the area (e.g. refer to 106 of FIG. 1). The major area is shown under a transparent cover overlaying the area (compare 110 in FIG. 1) and markings of 0% and 100% can be provided as shown. Thus, the step portion 312 is hidden in a solid covered portion while the transparent cover forms a viewable member. See e.g. FIG. 1. The substantially transparent portion is covered by the disc 304. The masked portion 308 and the disc 304 are substantially non-transparent and prevent light transmission of a light source such that at 0% position, a light indication of no-light is shown. The first wall 404 of the disc 304 abuts the second wall 406 of the step portion 312. In this position, the first wall 402 of the step portion 312 is disposed at the 0% marking and the second wall 406 of the step portion 312 is disposed at the 100% marking.

When the dial component 300 is turned in a clockwise direction, the disc holder 306 which is coupled to the dial component 300 turns correspondingly. The mating parts of the dial component 300 and the mating parts of the disc holder 306 interlock to move the disc holder 306 in association with movement of the dial component 300. Until the movement spans an arc of about 120°, the disc 304 remains stationary.

At step 5(*b*), the light indication is shown in the 20% position thereabouts. At the 20% position, a portion of the step portion 312 is moved under or exposed under the viewable member. A portion of the masked portion 308 is still presented under the viewable member and the remaining portion of the masked portion 308 is moved under and is covered by the disc 304. The disc 304 is at the same position, i.e. remains stationary, as when the dial 318 was at the start 0% position. Therefore, the portion of the step portion 312 which is presented under the viewable member allows light transmission and provides a light indication/visually distinguishable area to show a 20% position.

At step 5(*c*), as the dial component 300 continues to be turned in a clockwise direction, at the 60% position thereabouts, the first wall 402 of the step portion 312 makes contact with the second wall 502 of the disc 304. That is, movement of the actuating assembly has spanned an arc of about 120° from the 0% position. The disc 304 is at the same position as when the dial 318 was at the start 0% position. The step portion 312 is substantially fully moved under and exposed/presented by the viewable member to allow light transmission and provides a light indication/visually distinguishable area to show a 60% position. In this case, the substantially transparent portion 310 of the disc holder 306 is moved substantially fully under the opaque cover overlaying the minor area.

At step 5(*d*), as the dial component 300 is turned further in a clockwise direction after the 60% position, the disc 304 is engaged by the step portion 312 and moved in a clockwise direction along the recess 314. The step portion 312 and at least part of the substantially transparent portion 310 are exposed/presented under the viewable member. Light transmission through the step portion 312 and the exposed part of the substantially transparent portion 310 causes the light indication/visually distinguishable area to show the relevant position.

As the dial component 300 continues to be turned in a clockwise direction and reaches the 100% position, the disc 304 is fully hidden from the viewable member. The step portion 312 and the substantially transparent portion 310 are substantially fully exposed under the viewable member. That is, movement of the disc holder 306 has spanned about 240° from the start 0% position. Light transmission through the step portion 312 and the substantially transparent portion 310 provides the light indication/visually distinguishable area to show a full throttle display bar of 100%. This is also the end position of the dial 318.

Thereafter, at step 5(*e*), if a user turns the dial component 300 in an anti-clockwise direction, the disc 304 remains stationary in its position as when the dial 318 was at the 100% position. The disc holder 306 turns correspondingly in an anti-clockwise direction and begins exposing part of the substantially non-transparent masked portion 308. At the 40% position thereabouts, the second wall 406 of the step portion 312 makes contact with the first wall 404 of the disc 304. The step portion 312 and a portion of the masked portion 308 are presented under the viewable member. Light transmission through the step portion 312 provides a light indication/visually distinguishable area to show the relevant position. Light transmission is substantially prevented through the exposed portion of the masked portion 308.

As the dial component 300 continues to be turned in an anti-clockwise direction e.g. through a span of about 240° from the 100% position, the step portion 312 engages and pushes the disc 304 in an anti-clockwise direction and the disc 304 moves along the recess 314 of the disc holder 306.

At step 5(*f*), at the 20% position thereabouts, a remaining portion of the step portion 312, the full masked portion 308 and a portion of the disc 304 are presented under the viewable member. Compare step (b). Light transmission through the exposed portion of the step portion 312 provides the light indication/visually distinguishable area to show a 20% position. Light transmission is substantially prevented through the masked portion 308 and the exposed portion of the disc 304 under the viewable member.

At step 5(*g*), the disc 304 moves back to its original position (compare step 5(*a*)) when the dial component 300 moves back to the start 0% position. The movement of the disc 304 is via engagement with the second wall 406 of the step portion 312. The masked portion 308 and the disc 304 are thus presented under the viewable member. Light transmission is substantially prevented through the masked portion 308 and the disc 304. Therefore, the light indication/ visually distinguishable area shows a no-light indication at a 0% position.

Figure 6:
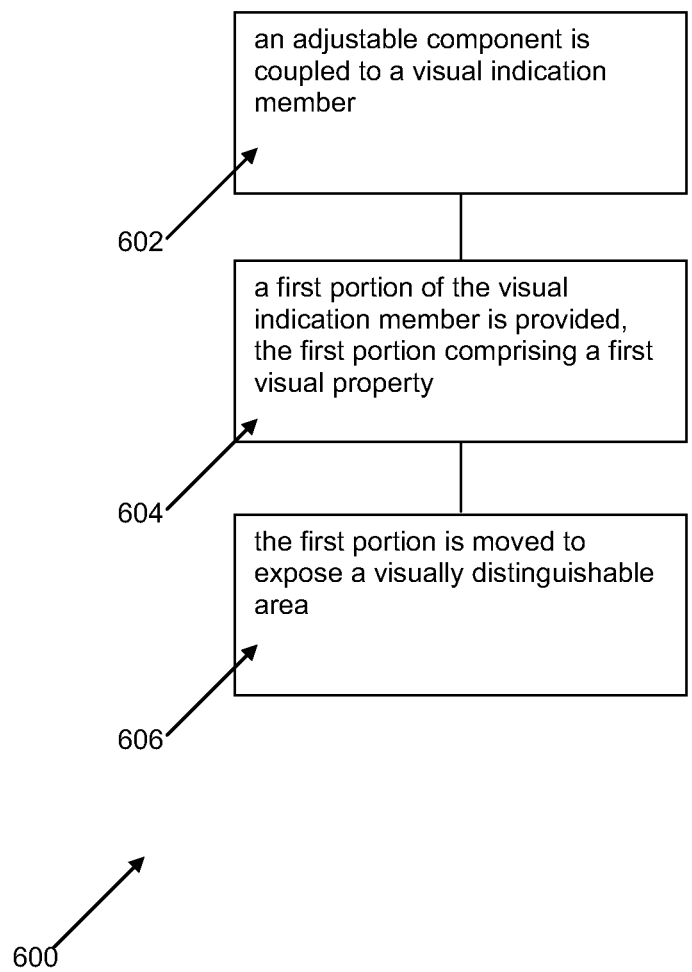
FIG. 6 is a schematic flowchart for illustrating a method for providing a visual indication for an adjustable component in an example embodiment.

FIG. 6 is a schematic flowchart 600 for illustrating a method for providing a visual indication for an adjustable component in an example embodiment. At step 602, an adjustable component is coupled to a visual indication member. At step 604, a first portion of the visual indication member is provided, the first portion comprising a first visual property. At step 606, the first portion is moved to expose a visually distinguishable area.

Figure 7:
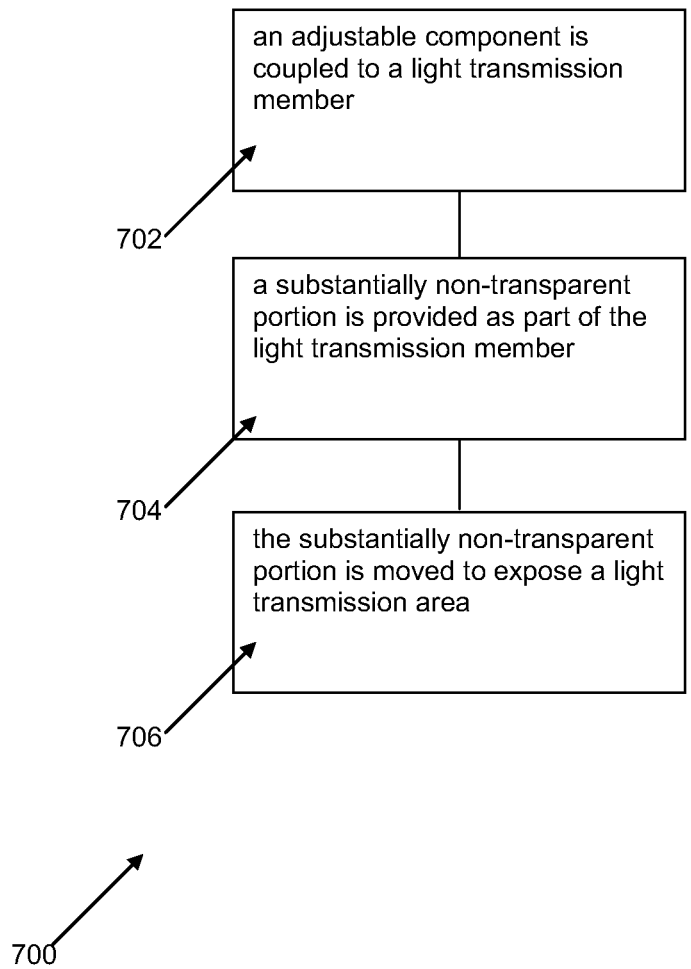
FIG. 7 is a schematic flowchart for illustrating a method for providing a light indication for an adjustable component in an example embodiment.

FIG. 7 is a schematic flowchart 700 for illustrating a method for providing a light indication for an adjustable component in an example embodiment. At step 702, an adjustable component is coupled to a light transmission member. At step 704, a substantially non-transparent portion is provided as part of the light transmission member. At step 706, the substantially non-transparent portion is moved to expose a light transmission area.

In the above example embodiments, although an arc of the viewable member is described as spanning over about 220° as illustrated in e.g. FIG. 1, the example embodiments are not limited as such. That is, the start position (i.e. 0% position) can be at 0° and the end position (i.e. 100% position) can be at 180° from the start position. The start position can even be at 0° and the end position can be at 360° from the start position.

In one example embodiment, with the start position (i.e. 0% position) at 0° and the end position (i.e. 100% position) at 180° from the start position, a visual indication member is provided under a substantially transparent overlay (that is the viewable member). The visual indication member comprises a foreground member comprising a first visual property, e.g. a substantially non-transparent portion, that covers substantially the whole of the area of the overlay at the 0% position. In the example embodiment, the substantially non-transparent portion can be semi-circular in shape with the arc angle spanning 180°. Thus, at 0%, if the example embodiment is associated with light transmission, light transmission is prevented.

The visual indication member comprises a coupling member that is fixedly coupled to the adjustable component. Such forms of coupling can be through adhesive or the like. The coupling is such that movement of the adjustable component moves the foreground member e.g. the substantially non-transparent portion. Thus, when the adjustable component is moved to a 50% position, the foreground member e.g. the substantially non-transparent portion moves correspondingly. For example, a distinguishable area provided by the movement of the foreground member can be exposed. As another example associated with light transmission, a light transmission area may be exposed through the overlay. When the adjustable component is moved back to a 0% position, the foreground member e.g. the substantially non-transparent portion moves correspondingly and removes the distinguishable area or covers the exposed light transmission area through the overlay.

Preferably, the visual indication member further comprises a base member such that movement of the foreground member e.g. the substantially non-transparent portion can be more stable if allowed to move on the base member.

In another example embodiment, with the start position (i.e. 0% position) at 0° and the end position (i.e. 100% position) at 360° from the start position, a visual indication member is provided under a substantially transparent overlay (that is the viewable member). The visual indication member comprises a foreground member, e.g. a substantially non-transparent portion, that covers substantially the whole of the area of the overlay at the 0% position.

In the example embodiment, the foreground member e.g. the substantially non-transparent portion can comprise a flexible member that is stackable in an oriental fan configuration. That is, the flexible member can be extended from a stack and can span 360° (at a start 0% position), and can be retracted to form a stack (at a end 100% position). The stack can be disposed at the end position. Thus, at 0%, if the example embodiment is associated with light transmission, light transmission is prevented.

The visual indication member comprises a coupling member that is fixedly coupled to the adjustable component. Such forms of coupling can be through adhesive or the like. The coupling is such that movement of the adjustable component moves the foreground member e.g. the substantially non-transparent portion. Thus, when the adjustable component is moved to a 50% position, the foreground member, e.g. the substantially non-transparent portion, moves correspondingly. For example, a distinguishable area provided by the movement of the foreground member can be exposed. As another example associated with light transmission, a light transmission area may be exposed through the overlay. This movement of the foreground member, e.g. the substantially non-transparent portion, may be a retraction of the flexible member into the stack. When the adjustable component is moved back to a 0% position, the foreground member, e.g. the substantially non-transparent portion, moves correspondingly and removes the distinguishable area or covers the exposed light transmission area through the overlay. This movement of the foreground member, e.g. the substantially non-transparent portion, may be an extension of the flexible member from the stack.

Preferably, the visual indication member further comprises a base member such that movement of the foreground member e.g. the substantially non-transparent portion can be more stable if allowed to move on the base member.

In the described example embodiments, the inventors have recognized that using mechanical components to show or reflect as visual or light indication the settings values of an energisable coil device (such as a relay) is not taught in the industry. Furthermore, using mechanical components can be relatively easy to incorporate in energisable coil devices without major redesign as compared to using electronic components. Using mechanical components is also relatively cheaper. In described example embodiments, a user can read off a settings value on a panel setting easily by looking at the level provided by the visual or light indication displayed by the viewable member. This can help a user to reduce the set-up time and/or maintenance time of an energisable coil device e.g. in low light conditions and in inaccessible environments, as opposed to reading mere markings on dials. An improved human machine interaction interface can thus be achieved together with relatively lower risks of adverse effects on energisable coil devices since, preferably, no additional electronic component is used for such light indication in the energisable coil devices.

Furthermore, providing viewable members in close proximity to the dials can better indicate e.g. which parameter is being set and reading off using the visual or light indications can be relatively easy.

In some example embodiments, markings indicating the settings values such as 0%, 20%, 40%, 60%, 80%, 100% etc are further indicated around the viewable member (compare 108, 110 of FIG. 1).

In the example embodiments, although a substantially transparent overlay (as the viewable member) has been described, it will appreciated that the example embodiments are not limited as such, and can include overlays that comprise color filters such that the visual or light indications have a different color, e.g. from the light indication indicating normal operations of the energisable coil device.

Furthermore, while the actuating assembly of some example embodiments has been described as having three segregated segments, it will be appreciated that any number of segments can be used. In addition, the placement of e.g. the substantially transparent and substantially non-transparent parts/portions can be varied. Further, movement that is converse to those described e.g. with reference to FIGS. 5(a)-5(g) can also be used. In the actuating assembly, it is also possible to have a single substantially transparent part and a plurality of substantially non-transparent parts for the visual/light indication to work.

It will be appreciated by a person skilled in the art that other variations and/or modifications may be made to the specific embodiments without departing from the scope of the invention as broadly described. The present embodiments are, therefore, to be considered in all respects to be illustrative and not restrictive.

What is claimed is:

1. A visual indication member for an adjustable dial component, the member comprising,
   a coupling member for coupling to the adjustable dial component;
   a movable member including a first portion including a first visual property, wherein the first portion is configured to move to expose a visually distinguishable area; and
   a base member that includes the coupling member, and including a first base portion including a second visual property, and including a step portion configured to movably abut the movable member, the movable member being disposed above the base member.

2. The visual indication member of claim 1, wherein the coupling member includes one or more gear teeth.

3. The visual indication member of claim 1, wherein the base member further includes a second base portion including the first visual property.

4. The visual indication member of claim 1, wherein the step portion includes the second visual property.

5. The visual indication member of claim 1, wherein the base member further includes a recess portion to allow movement of the movable member within the recess, and the base member is configured to be movable based on a coupling to the adjustable dial component.

6. The visual indication member of claim 1, wherein the base member is segregated into a plurality of segments, each segment of the plurality of segments spanning an arc angle of substantially 120°, and wherein the movable member is configured to movably expose a segment that is visually distinguishable from the movable member.

7. The visual indication of claim 6, wherein at least two segments of the plurality of segments are visually distinguishable from the movable member.

8. The visual indication member of claim 1, wherein the first visual property is different from the second visual property such that the visually distinguishable area is formed by a contrast between the first visual property and the second visual property.

9. The visual indication member of claim 1, wherein the first visual property and the second visual property include different colors.

10. The visual indication member of claim 1, wherein the first portion is configured to cover an area of a substantially transparent overlay disposed above the visual indication member, and wherein the coupling member is configured to be fixedly coupled to the adjustable dial component, and further wherein the first portion is configured to be moveable to expose a visually distinguishable area through the overlay based on a corresponding movement of the adjustable dial component.

11. The visual indication member of claim 1, wherein the first visual property includes a substantially non-transparent portion, and wherein the substantially non-transparent portion is configured to move to expose a light transmission area, the light transmission area being the visually distinguishable area.

12. The visual indication member of claim 11, wherein the light transmission area is an area of the base member.

13. The visual indication member of claim 11, wherein the second visual property is substantially transparent, and the base member includes a second base portion including the first visual property.

14. The visual indication member of claim 13, wherein the step portion includes the second visual property.

15. The visual indication member of claim 14, wherein the base member further includes a recess portion to allow movement of the movable member within the recess, and the base member is configured to move based on a coupling to the adjustable dial component.

16. The visual indication member of claim 11, wherein the base member is segregated into a plurality of segments, each segment of the plurality of segments spanning an arc angle of substantially 120°, and wherein the movable member is configured to movably expose a segment that is configured to transmit light.

17. The visual indication member of claim 16, wherein at least two of the segments of the plurality of segments are configured to transmit light.

18. The visual indication member of claim 11, wherein the substantially non-transparent portion is configured to cover an area of a substantially transparent overlay disposed above the light transmission area, and wherein the coupling member is configured to fixedly couple to the adjustable dial component; and further wherein the substantially non-transparent portion is configured to move to expose the light transmission area through the substantially transparent overlay due to a corresponding movement of the adjustable dial component.

19. A method for providing a visual indication for an adjustable dial component, the method comprising:
   coupling a visual indication member to the adjustable dial component;
   providing a movable member including a first portion of the visual indication member, the first portion including a first visual property;
   providing a base member including the visual indication member and including a first base portion and including a step portion, the first base portion including a second visual property, the movable member being disposed above the base member;
   using the step portion to movably abut the movable member; and
   moving the first portion to expose a visually distinguishable area.

20. The method of claim 19, wherein coupling a visual indication member to the adjustable component further includes using one or more gear teeth.

21. The method of claim 19, wherein providing a base member including a first base portion further includes the base member having a second base member, the second base member including the first visual property.

22. The method of claim 19, wherein providing a base member including a first base portion further includes the step portion including the second visual property.

23. The method of claim 19, further comprising:
providing a recess portion of the base member to allow movement of the movable member within the recess; and
moving the base member itself based on the coupling to the adjustable dial component.

24. The method of claim 19, further comprising:
segregating the base member into a plurality of segments, each segment of the plurality of segments spanning an arc angle of substantially 120°; and
providing the movable member to movably expose a segment that is visually distinguishable from the movable member, wherein at least two of the segments of the plurality of segments are visually distinguishable from the movable member.

25. The method of claim 19, wherein providing a movable member including the first base portion further includes the first visual property being different from the second visual property such that the visually distinguishable area is formed from a contrast between the first and second visual properties, and wherein the first visual property and the second visual property comprise different colours.

26. The method of claim 19, wherein coupling a visual indication member to the adjustable dial component further includes fixedly coupling the visual indication member to the adjustable dial component, and wherein the method further comprises:
disposing a substantially transparent overlay above the visual indication member;
providing the first portion to cover an area of the substantially transparent overlay, and
moving the first portion to expose a visually distinguishable area through the overlay due to a corresponding movement of the adjustable dial component.

27. The method of claim 26, wherein providing a first portion of the visual indication member further includes the first visual property being a substantially non-transparent portion, and wherein moving the substantially non-transparent portion exposes a light transmission area as a visually distinguishable area.

28. The method of claim 27, wherein providing a first portion of the visual indication member further includes the light transmission area being an area of the base member.

29. The method of claim 19, wherein the second visual property is substantially transparent, and wherein providing a base member further includes providing a second base portion including the first visual property.

30. The method of claim 29, wherein the step portion includes the second visual property.

31. The method of claim 27, wherein providing a base member further includes segregating the base member into a plurality of segments, each segment of the plurality of segments spanning an arc angle of substantially 120°, and providing a movable member to movably expose a segment configured to transmit light, and wherein at least two segments of the plurality of segments are configured to transmit light.

32. The method of claim 27, wherein coupling a visual indication member to the adjustable dial component further includes fixedly coupling to the adjustable dial component, the method further comprising:
disposing a substantially transparent overlay above the substantially non-transparent portion;
providing the substantially non-transparent portion to cover an area of the substantially transparent overlay; and
moving the substantially non-transparent portion to expose the light transmission area through the overlay due to a corresponding movement of the adjustable dial component.

* * * * *